(No Model.)
C. GLOVER.
SAW SCREW.
No. 375,350. Patented Dec. 27, 1887.
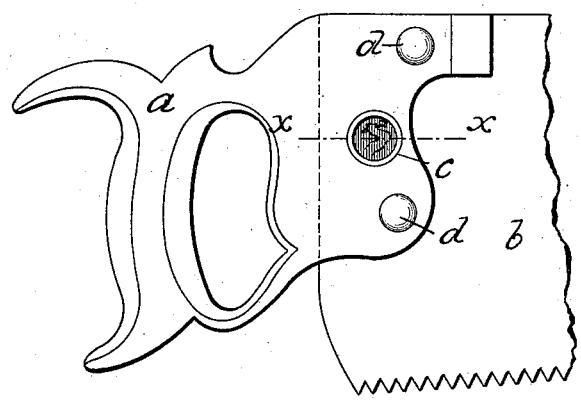
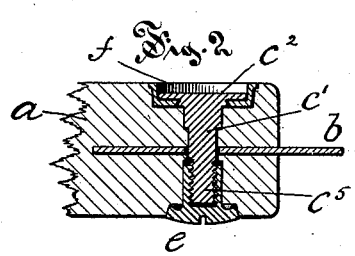
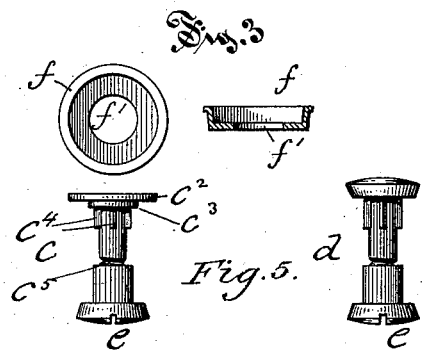
Witnesses:
W. M. Bjorkman
N. R. Williams.
Inventor:
Charles Glover
by Simonds & Burdett,
Attys

UNITED STATES PATENT OFFICE.

CHARLES GLOVER, OF HARTFORD, CONNECTICUT.

SAW-SCREW.

SPECIFICATION forming part of Letters Patent No. 375,350, dated December 27, 1887.

Application filed August 2, 1886. Serial No. 209,715. (No model.)

*To all whom it may concern:*

Be it known that I, CHARLES GLOVER, of Hartford, Hartford county, State of Connecticut, have invented certain new and useful Improvements in Saw-Screws, of which the following is a full, clear, and exact description, whereby any one skilled in the art can make and use the same.

My improvement relates to the class of screws that are adapted for use in securing a saw-blade to its handle.

Prior to my improvement there were in use saw-screws having the broad head of its class with the screw-shank brazed to its under side; but such a screw is open to the objection that the head is pulled off too readily. Another screw of this class is made by connecting the end of the screw-shank to the head by swaging the parts together. The objection to this latter screw is that the head is liable to become loose upon the shank and to turn around, thus disarranging the reading-matter usually stamped upon the head of the screw, while a further objection is that the peculiar method of making requires that the whole head shall be made of comparatively thick metal.

The object of my improvement is to provide a wrought-metal saw-screw that, possessing all the advantages of those above referred to, shall be free from the objections and possess advantages peculiar to themselves; and to this end my improvement consists in the combination of a saw-screw with its shank threaded and having an integral head, with a shoulder beneath the head, and integral projections extending along the shank for a limited distance to prevent the screw from turning in its socket in the handle, and a flanged cup or recessed finishing-piece of thin metal and having a central opening that fits about the shoulder beneath the head of the screw, and a nut by means of which the screw is held in place; and it further consists in details of the parts of the device, as more particularly hereinafter described, and pointed out in the claims.

Referring to the accompanying drawings, Figure 1 is a side view of a part of a saw showing the screws used for fastening the blade to the handle. Fig. 2 is a view in cross-section through the label-screw on plane denoted by line $x\ x$ of Fig. 1, on enlarged scale. Fig. 3 is a detail view in plan and section of the several parts composing my improved screw. Fig. 4 is a detail view in cross-section of a modified form of the receiver. Fig. 5 shows in side view the two forms of saw-screws, the one on the left having a broad flat head, enabling it to be used as a trade-mark screw, while the one on the right shows the ordinary-formed screw with nut in place.

In the accompanying drawings my improvement is illustrated in connection with a carpenter's saw, which illustrates its method of use on all classes of saws, and shows the method of uniting the handle $a$ to the blade $b$. The blade first having been provided with the usual holes in the end adapted to fit within the blade-socket in the handle, the screws $c\ d$ are inserted in the usual manner and the nuts turned home, clamping the blade securely in place. As the result of custom and long use, the trade and the users of saws require that the screws used for the above purpose shall be of peculiar form, and that one at least shall be a "label-screw," the head of which is large, flat, and particularly adapted for receiving the imprint of a label or trade-mark, while the other screws, although also having comparatively large heads, are termed "common screws." These two kinds of saw-screws are arranged somewhat as shown in Fig. 1 of the drawings, and my improvement, so far as it relates to the label-screw, meets the requirements as above, while avoiding objectionable features of prior devices.

The label-screw $c$ has a shank, $c'$, and integral with it a broad flat head, $c^2$, formed by upsetting the end of a bolt or wire of proper diameter to form the shank. The head $c^2$ has on the under side an annular shoulder, $c^3$, that is preferably undercut on the edge, while below this shoulder are formed the integral ribs $c^4$, that are arranged about the shank and extend along it a short distance. The lower end of this bolt is provided with a screw-thread, $c^5$, on which a nut, $e$, is fitted. On the face of this broad head $c^2$ is sunk or raised, by means of dies, any desirable symbol—as of the arm holding the hammer shown in Fig. 1—and any suitable lettering.

A shallow cup, $f$, with a central hole, $f'$, into which the shoulder $c^3$ fits, is also provided, the flanged edge of the cup tapering outward and slightly overhanging the edge of the countersunk hole in the handle, into which this cup fits.

The hole in the cup $f$ is made a scant fit, so that the cup may be sprung onto the shoulder, it being the function of the under-cut to provide for the close fitting of the cup upon the shoulder after it has been sprung over the lower edge, and this holds the parts firmly together, so as to obtain the benefit of the broader bearing of the outer edges of the cup in resisting the tendency of the screw to be worked out of place by the strain across the axis of the screw in sawing. The hole through the handle to receive the screw is of the diameter of the shank, and the screw is fitted tightly against turning in the handle by driving it in, the ribs $c^4$ holding the screw while the nut is turned home.

The broadened edge of the cup, as well as its wide flat bottom, furnishes a bearing-surface that prevents the screw from wearing loose in the use of the saw, the strain of such use coming across the axis of the shank and tending to loosen an ordinary screw. In making such a screw there is provided a broad flat head, of sufficient size for its intended use, that is absolutely integral with the shank, and all danger of breaking is obviated by the thickness of the central portion of the head. The edge of the head, shoulder $c^3$, and the ribs also form an additional safeguard against the breaking off of the head.

A modified form of washer or cup is shown at $g$ in Fig. 4; and in this form, as well as in that already described, the cup and the head are swaged together by means of a hollow punch that upsets the lower edge of the shoulder outward toward the edge of the opening in the cup, as illustrated in the sectional view.

The common screw $d$ is formed, as to the shank and head, in a precisely similar manner as the label-screw, the head being less in diameter and the shoulder $c^3$ being omitted, the advantages incident to the making of shank and head in one piece by the endwise compression of the shank in suitable dies being present in this form as well as in the other.

I claim as my improvement—

1. In combination with a saw-screw having a threaded shank, a broad integral head, and a shoulder beneath the head, the flanged cup with the central opening adapted to fit about the shoulder beneath the head, and the nut adapted to fit the threaded end of the screw, all substantially as described.

2. In combination with the saw-screw having the broad integral head, the undercut shoulder beneath the head, the ribs extending along the shank from beneath the head and the threaded shank, the recessed cup with the downturned flange and having the central opening adapted to fit about the shoulder beneath the head of the screw, all substantially as described.

CHARLES GLOVER.

Witnesses:
CHAS. L. BURDETT,
E. P. PELTON.